March 31, 1953  E. J. ABBOTT  2,633,020
APPARATUS FOR INVESTIGATING SURFACE PROFILES
Filed Nov. 19, 1947  3 Sheets-Sheet 1
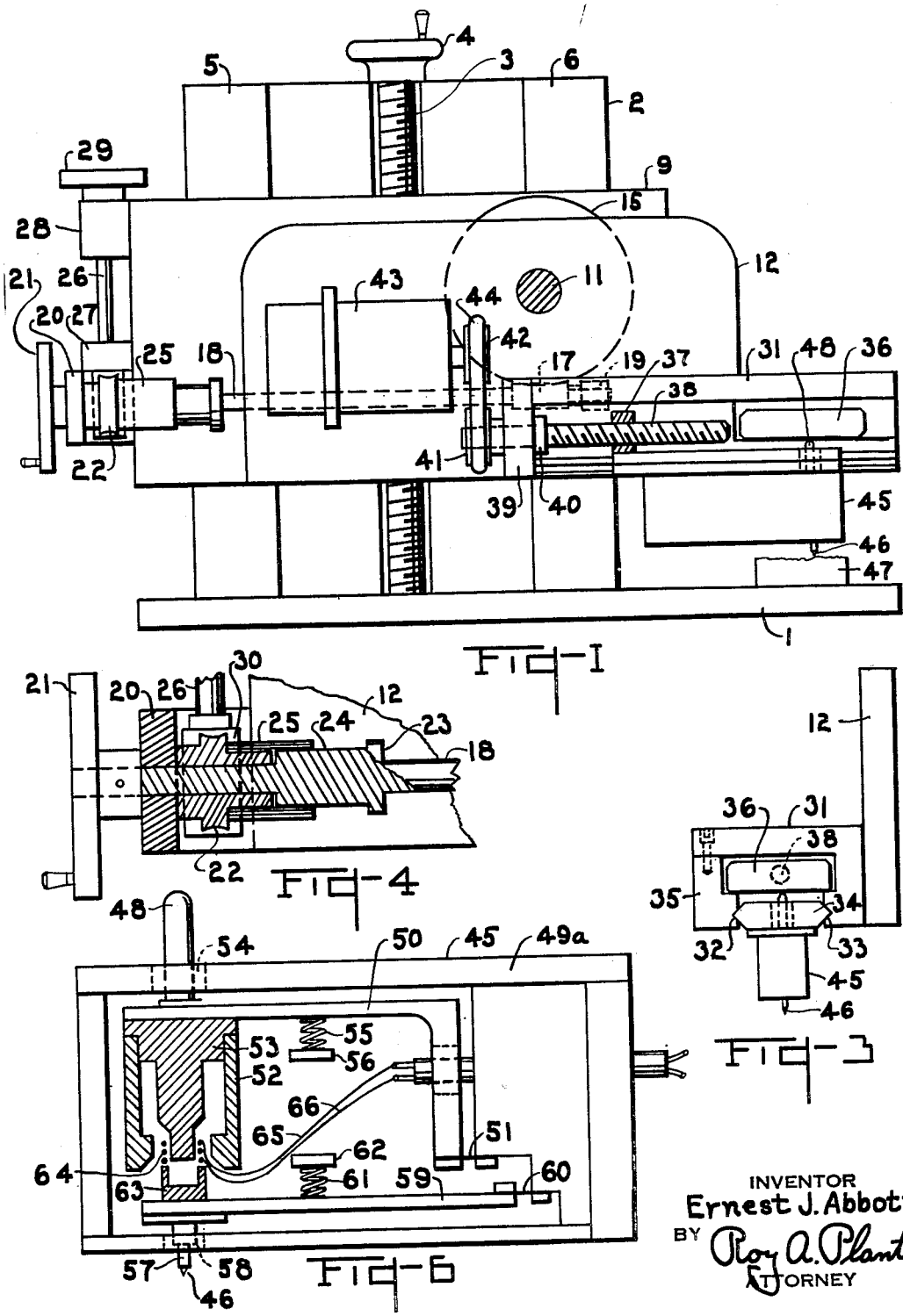
INVENTOR
Ernest J. Abbott
BY Roy A. Plant
ATTORNEY

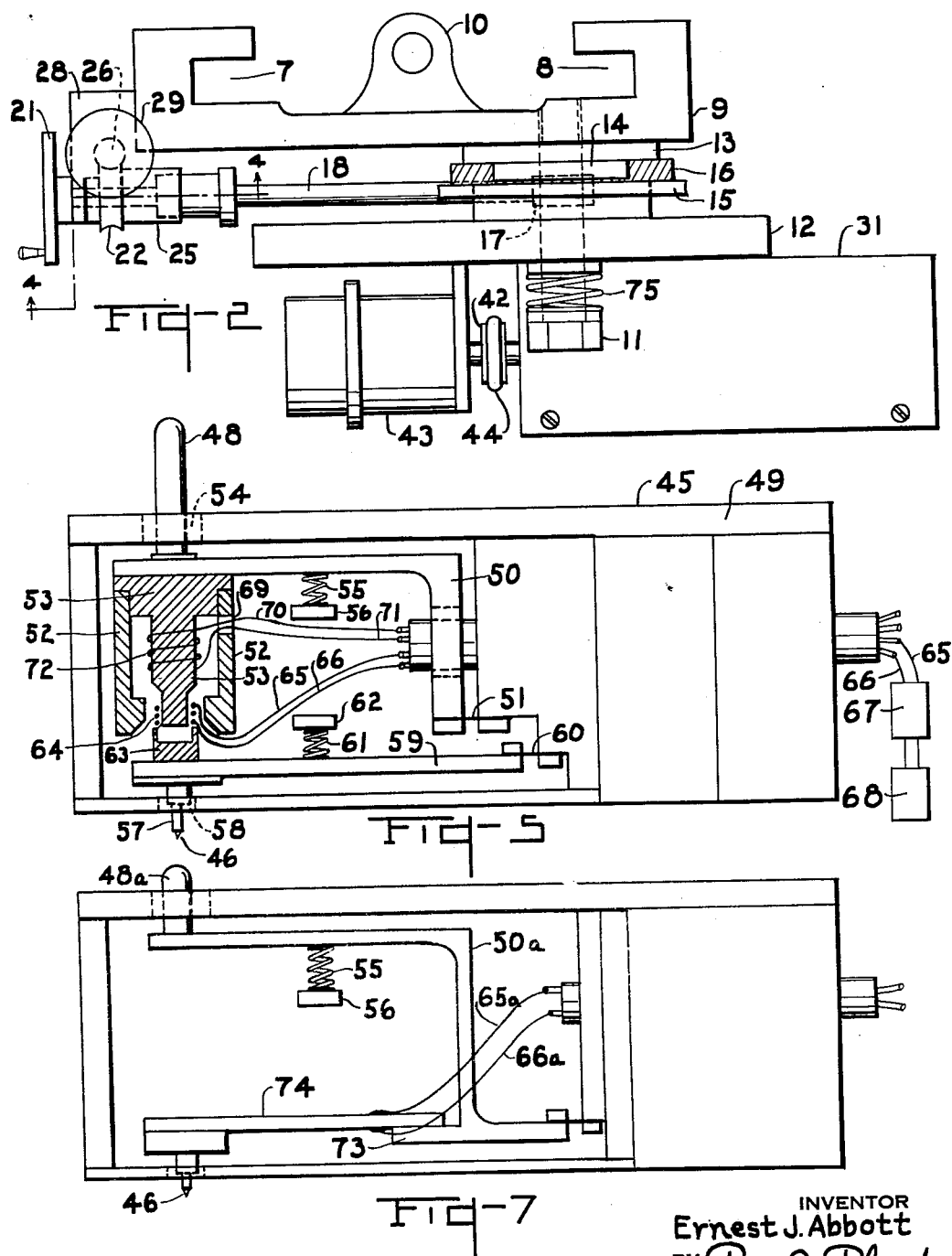

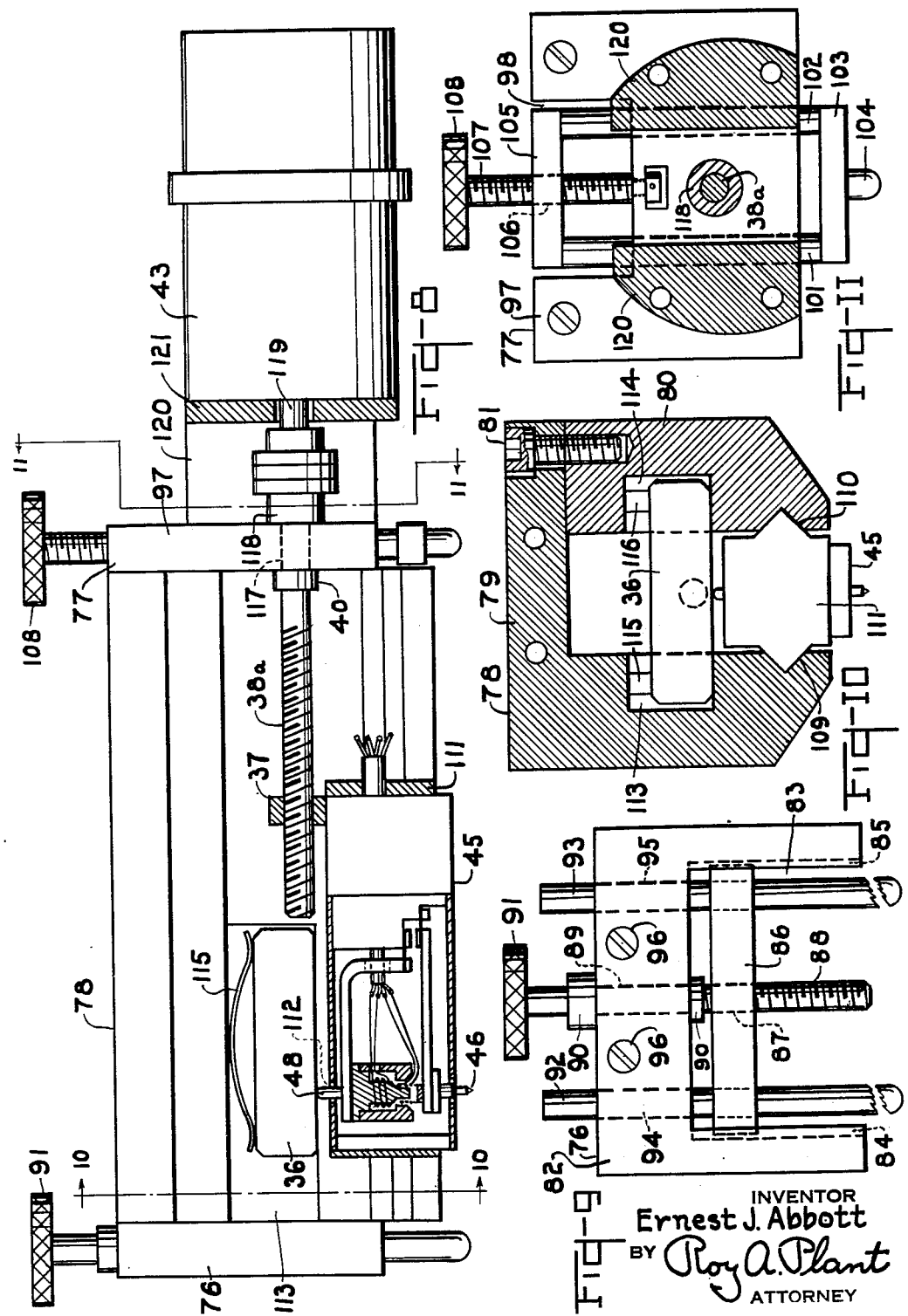

Patented Mar. 31, 1953

2,633,020

UNITED STATES PATENT OFFICE 2,633,020

APPARATUS FOR INVESTIGATING SURFACE PROFILES

Ernest J. Abbott, Ann Arbor, Mich.; Marion E. Abbott, administratrix of said Ernest J. Abbott, deceased Application November 19, 1947, Serial No. 786,871

16 Claims. (Cl. 73—105)

The present invention relates broadly to measuring and recording equipment, and in its specific phases to an instrument which may be employed for the highly sensitive investigation of irregularities in the profile of a specimen.

Under present day machining operations, it has become important in many cases to know the condition of the surface being produced, regardless of whether it be the surface of a plate of glass, bearing, cylinder wall, or the like. This information, which involves surface profile variations such as waves, bows, steps, and individual peaks and valleys, is not only useful in connection with the production of a finished surface and the checking of same, but also in checking the machine which is used to produce the surface. The latter leads to better designed machines, as well as the making of repairs to machines to overcome or minimize errors which commonly repeat, such as chatter marks and waves in the surface being produced.

It is common practice to provide surface checking instruments with ways on which certain of the parts are carried, including the tracer point which is moved in contact with, and over the surface being investigated. In actual practice it has been found impossible to produce ways which are perfectly accurate, since they invariably have one or more waves, bows, steps, peaks and valleys, and frequently are warped by fastening down as well as from stress relieving during machining. Variation in lubrication from end to end of the ways also affects this, and even if one portion of the ways is warmer than another this makes the layer of lubricant thinner at the warm portion which affects the accuracy of movement of the member mounted on the ways. In fact, tests of the surface of an optical flat, where the checking apparatus is supported on ways but piloting is not involved, commonly show definite waves of approximately ten to fifty millionths of an inch in height and from $\frac{1}{16}$ to $\frac{1}{2}$ inch long, such waves being caused almost entirely by inaccuracies of the ways of the testing apparatus, and variations in their lubrication. This is obvious since by piloting the checking apparatus in accordance with the present invention, and moving same on the same ways, the same waves on the optical flat are found to be only one or two millionths of an inch high and thus within the normal guaranteed range of the optical flat itself. It is thus clear that the highly sensitive and accurate measuring of profile variations of this nature requires equipment adapted to measure more accurately than the best ways will permit alone, and to this end I propose to use a special arrangement of apparatus which includes a tracer assembly, supporting ways, and a skid with pilot surface to eliminate the effects of errors in the ways, as well as errors introduced by lubrication on the ways.

The present invention may be considered as an improvement over the apparatus and operation disclosed in Patent No. 2,048,154, issued July 21, 1936, to E. J. Abbott and F. A. Firestone. That patent deals with an apparatus for determining roughness of surfaces and involves the mounting of a specimen to be checked, and a master form having a surface with which comparison is to be made, one above the other, both being placed on a common support carried on ways, such support being moved on the ways by means of a crank operated threaded means. A substantially U-shaped one piece frame, which is tilted edgewise 90°, carries the tracer point hinged on the end of its upper member in position for resting on the upper face of the specimen, and a skid on the end of its lower member for moving on the upper surface of the master form, the U-shaped member being carried on a hinge pivot substantially in the same horizontal plane as the tracer point. The tracer point, which rests on the specimen, in turn carries a small mirror which is used to deflect a beam of light and direct same onto a light sensitive strip member on a drum which rotates in step with the movement of the ways mounted support member which carries the master form and specimen. This light sensitive strip member, when thus exposed and later developed, shows a saw-tooth curve which is measurable to indicate the dimensions of the surface roughness of the specimen under investigation.

That apparatus, which had to be operated in a dark room and normally with a light-tight cover, was difficult to perfectly align so that the surface of the specimen and the surface of the master form were parallel, horizontal, and properly spaced. It also frequently required cutting a specimen from the article under consideration, thus spoiling it so far as further use was concerned, and introducing distortion of the part by relieving of internal stresses. In addition the light beam had to be made to fall on and stay on the light sensitive strip material in the proper operating range, and the apparatus could only be used in upright horizontal position, all of which made the apparatus exceedingly slow and difficult of operation. It was a recognition of these and other shortcomings of the prior art, as well as the difficulties involved, which lead to the conception and development of the present invention.

Accordingly among the objects of the present invention is the provision of a profile investigating apparatus which is easily adjusted, eliminates the effect of errors in the ways of the assembly, can be operated in open light, and is less sensitive to extraneous vibration so that it can be operated in machining and grinding rooms of factories.

Another object of the invention is to provide an electrically operated profile investigating apparatus which has a skid which slides on a fixed location master surface to eliminate the errors in the ways of the assembly.

Another object of the invention is to provide a profile investigating apparatus which has a skid member which slides on a master surface and is independent of movements of the housing on which the skid member is pivotally mounted.

A further object of the invention is to provide a profile investigating apparatus which has a reference portion which is individually pivoted and controlled in its movement by a skid and master surface, a separately pivoted moving portion carrying a tracer point, and an electric means for determining the displacements of the moving portion relative to the reference portion as the tracer point moves over the profile being investigated.

A further object is to provide a profile investigating apparatus which has a frame member on which is pivotally mounted a reference portion, said reference portion, which includes a magnetic member with a pole gap substantially in the same horizontal plane as the hinge of said reference portion, has a skid member mounted to move therewith, said frame member also having a moving portion which is pivoted at one end on said frame adjacent the pivot of the reference portion, the other end of said moving portion having a tracer point projecting downward therefrom, and a coil of insulated wire mounted thereabove for movement in the pole gap of said magnetic member.

A further object is to provide a profile investigating apparatus which has a pivotally mounted reference portion which carries a skid projecting thereabove, a master surface member in contact with said skid, a pivotally mounted moving portion which carries a downwardly directed tracer point, and a specimen on which said tracer point is in contact, the surfaces of said specimen and said master surface member being substantially parallel, with said skid and tracer point between same.

Still further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

Figure 1 shows a front elevational view of one general assembly of the present invention.

Figure 2 shows a partially sectioned top view of that portion of the assembly which is in front of the upright member 2 of Figure 1.

Figure 3 shows a partial end view of the front portion of the Figure 1 assembly as taken at the right hand end of same.

Figure 4 shows an enlarged partial vertical section of the tilting mechanism as taken at line 4—4 of Figure 2 looking in the direction of the arrows.

Figure 5 shows an enlarged and partially sectioned modified tracer assembly of preferred construction utilizing an electro-magnet.

Figure 6 shows an enlarged and partially sectioned permanent magnet and coil type of tracer assembly suitable for dynamic operation in accordance with the present invention.

Figure 7 shows another enlarged and modified form of the tracer assembly wherein a piezo crystal is used in place of the magnet and movable coil of Figures 5 and 6.

Figure 8 shows a partially sectioned side elevational view of a portable form of the present invention from which side member 80, illustrated in Figure 10, has been removed.

Figure 9 shows an end elevational view of the Figure 8 assembly as taken from the left end of same.

Figure 10 shows a sectional view as taken along line 10—10 of Figure 8 looking in the direction of the arrows.

Figure 11 shows a sectional and elevational view as taken along line 11—11 of Figure 8 looking in the direction of the arrows.

Referring more particularly to Figure 1 of the drawing, it will be noted that the apparatus has a base member 1 and an upright member 2 joined thereto. This upright member has conventionally mounted thereon with suitable bearings (not shown) a vertical screw 3 with a hand wheel 4 mounted on the upper end of same. Side members 5 and 6 of upright member 2 are accurately machined to fit ways 7 and 8, Figure 2, of carrier member 9 which has an internally threaded member 10 operably engaging screw 3, Figure 1, so that the rotation of the latter by means of hand wheel 4 will correspondingly raise or lower carrier member 9.

Mounted on carrier member 9 by means of shaft 11 is a support member 12. Concentric with shaft 11 and fastened to the front face of carrier member 9 is a plate 13, Figure 2, the front face of which has a circular boss 14 which is also concentric with shaft 11. Worm wheel 15 has mounted on its rear face a plate 16 which, in turn, is counterbored on its rear face to receive and closely fit boss 14 of plate 13. Plate 16 extends through worm wheel 15 and its front face is conventionally joined to the rear face of support member 12 so that any rotary movement of worm wheel 15 will correspondingly rotate support member 12. Compression spring 75 mounted on shaft 11 acts to take up any slack between carrier member 9 and support member 12, and frictionally steadies support member 12, and the parts carried by it, on carrier member 9.

Meshing with the bottom edge of worm wheel 15, Figure 1, is a worm gear 17 which is conventionally fastened on shaft 18 with the latter supported at one end by bearing 19 and at the other end with bearing 20. On the outer end of shaft 18 is mounted a hand wheel 21 which is used for making coarse rotary adjustments of support member 12. Mounted on shaft 18 adjacent bearing 20 is a worm wheel 22, Figure 4. Shaft 18 adjacent worm wheel 22 is enlarged and provided with a shoulder member 23. The adjacent end of worm wheel 22 is extended and machined to the same diameter as enlargement 24 of shaft 18. Both of these members are conventionally splined lengthwise in alignment and a correspondingly internally splined sleeve 25 is adapted to be slid endwise on the splines. With sleeve 25 in its left position, as shown in Figure 4, worm wheel 22 will be positively joined by sleeve 25 to shaft 18 and will rotate therewith. On the other hand, when sleeve 25 is slid to the right up against shoulder 23, worm wheel 22 will be freely rotatable on shaft 18 for a purpose to be hereinafter described. Vertical shaft 26, Figures 1 and 4, is carried on bearings 27 and 28 on the end of carrier member 9. This shaft has an operating knob 29 on its upper end while its lower end carries a worm gear 30 in mesh with worm wheel 22.

In order to rotatably adjust support member 12 about shaft 11, sleeve 25, Figure 4, is slid to the right which releases worm wheel 22 and permits hand wheel 21 and shaft 18 to be rotated freely, and through the rotation of worm gear 17 and worm wheel 15 to rotate support member 12 about shaft 11. When the adjustment is approximately correct for aligning the underface of optical flat 36 with the upper face of specimen 47, sleeve 25 is slid to the left and then by turning knob 29, worm gear 30 through its engagement with worm wheel 22 mounted on shaft 18 will produce a very fine adjustment of support member 12 about shaft 11, which permits the accurate completing of the alignment ready for conducting the investigation of the profile of specimen 47.

On the front face of support member 12, Figure 3, is mounted a bracket 31 with ways 32 and 33 which carry a slide member 34 adapted for endwise movement. Way 32 is formed in depending member 35 of bracket 31, and such depending member is adjustable in conventional manner to facilitate making a close but free sliding fit of slide member 34 in ways 32 and 33. Mounted within bracket 31 in conventional manner is an optical flat 36, the highly accurate under face of which will be used for piloting as hereinafter described.

In order to move slide member 34 endwise, same may be provided on its rear upper edge with a suitably threaded nut 37, Figure 1, adapted to mesh with a correspondingly threaded screw 38 which passes through end member 39 of bracket 31, this end member acting as a bearing for screw 38, the latter in turn having a collar 40 mounted on one side of end member 39 and a pulley 41 on the other side of same, this collar and pulley acting to substantially prevent end play of shaft 38 under operating conditions. Pulley 41 is preferably operably connected to pulley 42 of reversable motor 43 by means of a conventional belt 44 for smooth operation. Tracer assembly 45 is conventionally anchored to the bottom of slide member 34 for operation as will be hereinafter described. It is to be noted in this connection that the operation of motor 43 in either direction within the operating limits of the apparatus will move tracer assembly 45 to the right or left with tracer point 46, under conditions of use, in contact with the upper face of the specimen 47, and preferably substantially perpendicular thereto, while the rounded face of skid member 48, which preferably has a radius varying from $\frac{1}{16}$" to $\frac{1}{8}$", will slide on the under face of optical flat 36.

In Figure 5 the tracer assembly 45 is shown in enlarged view, which is turned end for end from the position shown in Figure 1, and a side plate removed from same to show diagrammatically the working parts of same. This construction has a frame member 49 which has a reference member support 50 pivotally mounted on a leaf spring pivot member 51. At the opposite end of support 50 from pivot 51 is mounted a reference member which may be in the form of a magnet having an outer pole member 52 and an inner pole member 53 with an annular gap therebetween at the lower end of the pole members. This magnetic structure is made from suitable laminated or powdered material to minimize core loss, and the outer pole 52 is provided with an opening 69 for a pair of wires 70 and 71 which are connected to a coil of wire 72 wound around inner pole 53 such that upon passing alternating-current therethrough the structure becomes an alternating-current electro-magnet. Several forms of electric circuits, which may be suitably used with this construction, are shown in the copending patent application of Dorman E. Priest, Ser. No. 555,942, filed September 27, 1944, which has now been abandoned in favor of two continuation-in-part applications filed October 8, 1949, and carrying Serial Nos. 120,328 and 120,329. A particular advantage of this construction, when operating on alternating-current, is that it is free from low frequency cut-off conditions, which thus makes possible the direct indicating or recording of variations in a profile under investigation even when the apparatus is standing still, a thing which is not true with either a permanent magnet system such as is shown in Figure 6, or a piezo crystal system such as is shown in Figure 7, both of which require movement to operate. Above the magnet and mounted on support member 50 is a skid member 48 which passes through a suitable opening 54 in frame member 49. A compression spring 55 mounted on bracket 56 of frame member 49 acts through contact with the under face of support member 50 to hold skid member 48 in contact with the under face of optical flat 36, Figure 1.

Tracer point 46, Figure 5, is mounted on the end of a projecting arm 57 which extends through a small opening 58 in the lower face of frame member 49. The tip radius of the tracer point 46 is made sufficiently small to "bottom" the irregularities being investigated. On machined and ground surfaces, this requires a tip radius smaller than .001" and preferably smaller than .0001" for finest detail. For waviness the tip radius can be much larger. The projecting arm member 57 is mounted on the under face of a beam 59 which is pivotally mounted on frame 49 by means of a leaf spring pivot member 60. A suitable compression spring 61 supported by bracket 62 on frame 49 acts to hold tracer point 46 in extended position under normal operating conditions. Mounted on the upper face of beam 59 directly under inner pole 53 of the magnet, is a light-weight coil form 63, or moving element, which carries a coil 64 on its upper edge in position to move freely lengthwise in the annular gap between outer and inner poles 52 and 53. Under operating conditions the movement of the magnet and coil is so small that for all practical purposes it is linear and substantially parallel, and will be so considered. Connected to the ends of this coil 64 is a pair of wires 65 and 66 which deliver the output of coil 64 to a suitable amplifier 67 which in turn delivers its output to a suitable indicating or recording apparatus 68.

A variation of the construction shown in Figure 5 is illustrated in Figure 6 wherein the outer and inner poles 52 and 53 are in the form of a permanent magnet, the coil 72 and its leads 70 and 71 being omitted.

A further modification of the tracer assembly of the present invention is shown in Figure 7, wherein the reference element 50a is modified to the extent of having an extending ledge member 73 on which is fastened a piezoelectric crystal 74 on the end of which is mounted tracer point 46 for operation as previously described. Wires 65a and 66a are connected to the opposite sides of the piezoelectric crystal 74 in accordance with well established practice. The mechanical stressing of the piezoelectric crystal under the influence of movements of tracer point 46 produces an electric voltage which is delivered as before to a suitable amplifier, and then to an indicating or recording apparatus.

A portable form of the present invention is shown in Figure 8, such construction using a frame which is divided into two subassemblies 76 and 77 fastened respectively to the opposite ends of support member 78. This support member, as is shown in Figure 10, has a main member 79 and a side member 80 adjustably joined together in conventional manner, such as by means of Allen head screws 81.

Frame subassembly 76 has a body member 82, Figure 9, the bottom center portion of which is provided with a recess 83 having edge grooves 84 and 85 in which the ends of a guide member 86 freely slide. This guide member is provided with a vertical center opening 87, which is threaded to operably engage screw member 88 which passes through a suitable bore 89 in body member 82, and is substantially held against endwise displacement by collars 90. For ease of operating this screw member 88, it is provided on its upper end with a knurled head member 91. A pair of rounded end rod type skid members 92 and 93 slidably fit suitable openings 94 and 95 in body member 82, said skid members being conventionally anchored to guide member 86 so that as knurled member 91 is rotated within the limits of its operation, skid members 92 and 93 will be correspondingly raised or lowered. Body member 82 may be anchored to support member 78 in conventional manner such as by means of screws 96.

At the opposite end of support member 78 from that occupied by frame subassembly 76 is the second frame subassembly 77, which is shown in end view in Figure 11. This frame subassembly has a body member 97, the upper end of which is provided with a recess 98 from the bottom of which extends substantially parallel openings through which a pair of rods 101 and 102 pass, said rods having a cross member 103 conventionally joined to their lower ends and said cross member in turn carries a skid member 104. Rods 101 and 102 also have a cross member 105 conventionally fastened to their upper ends, and this cross member in turn is provided with a suitably threaded opening 106 adapted to engage screw member 107 which carries a knurled knob 108 on its upper end. The lower end of screw member 107 is conventionally fastened to body member 97, as is diagrammatically shown, for rotation with substantially no endwise movement therein. It is thus to be seen that by rotating knob 108 skid member 104 will be correspondingly moved to or from the underface of body member 97.

Main member 79, Figure 10, and side member 80 of supporting member 78 are provided with ways 109 and 110 in which a slide type support member 111 is adapted to closely but freely slide. Mounted within supporting slide member 111 is a tracer assembly 45, a preferred form of which is shown in enlarged detail in Figure 5, although the invention is not limited to that specific construction since other forms are likewise usable and two of them have been shown in detail in Figures 6 and 7. Main member 79 and side member 80 are respectively formed with inner aligned recesses 113 and 114 in which is mounted a master surface member in the form of an optical flat 36. This optical flat may be held in place in any suitable manner, such for instance as by means of leaf springs 115 and 116. Skid member 49 of tracer assembly 45, which projects through opening 112 in supporting slide member 111, is adapted to slide on the underface of this optical flat 36, as has been previously described.

Mounted on the upper edge of supporting slide member 111 is a nut 37, Figure 8, which threadedly engages screw 38a which, in turn, fits a suitable opening 117 in body member 97 of frame subassembly 77, and is substantially held against endwise movement by a collar 40 and a coupling 118. This coupling is joined at its other end to shaft 119 of reversible motor 43, which is supported on body member 97 of frame subassembly 77 by means of a frame member 120 having an end plate 121 to which motor 43 is fastened.

The apparatus shown in the Figure 8 assembly is portable and particularly adapted for direct mounting on, or over, a specimen, a portion of the surface of which is to be investigated for profile variations. By having three skids, as shown, it is relatively easy to adjust the apparatus to many types of specimens, it being only necessary to rotate knurled knobs 91 and 108 until tracer point 46 is in contact with the surface to be investigated and is adapted to be carried substantially parallel thereto, while moving substantially perpendicular to the surface being investigated due to profile variations encountered thereon. With the assembly thus in place and adjusted, the operation of reversible motor 43 to draw tracer point 46 along the surface to be investigated causes electricity to be produced in secondary coil 64, as previously described, following which such electrical output can be amplified by a suitable amplifier 67, Figure 5, and then delivered to a suitable indicating or recording apparatus 68.

Other modes of applying the principle of my invention may be employed instead of those explained, change being made as regards the article and combinations herein disclosed, provided the means stated by any of the following claims or the equivalent of such stated means be employed.

I therefore particularly point out and distinctly claim as my invention:

1. An apparatus for investigating the profile of the surface of a specimen, which comprises a frame having a support member, adjustable means for locating said support member with respect to said specimen to be investigated, a slide member, means for movably supporting said slide member on said support member, means for moving said slide member on said support member, a pilot surface adjacent to said slide member, a tracer assembly having a frame fixedly mounted on said slide member, said tracer assembly having a reference member therein, means for movably mounting said reference member on said frame and restricting it to a substantially linear motion, said linear motion being substantially perpendicular to the surface of said specimen, a skid member mounted to move with said reference member and extending into contact with said pilot surface for sliding thereon, said tracer assembly also having a moving element in operative relation to said reference member, means for mounting said moving element on said frame for movement relative to said reference member in said tracer assembly and restricting such movement to substantially linear motion, said linear motion being substantially parallel to the line of motion of said reference member, a tracer point mounted on said moving element and extending into contact with the profile of the surface of said specimen to be investigated, electric circuit means for producing voltages substantially proportional to the displacements of said moving element relative to said reference member, and means utilizing said voltage output to indicate the displacements of said tracer point produced by the irregularities of the profile of the surface of said specimen being investigated.

2. An apparatus for investigating the profile of the surface of a specimen, which comprises a frame having a carrier member, adjustable means for moving said carrier member to and from said specimen to be investigated, a support member, means for mounting said support member on said carrier member, a slide member, means with ways for supporting said slide member on said support member, means for moving said slide member on said ways, a pilot surface adjacent to said slide member, said pilot surface being supported by said support member, a tracer assembly having a frame fixedly mounted on said slide member, said tracer assembly having a reference member therein mounted for movement relative to said frame member, said reference member being restricted to substantially linear motion, said linear motion being substantially perpendicular to the surface of said specimen, a skid member mounted to move with said reference member and extending into contact with said pilot surface for sliding thereon, said tracer assembly also having a moving element in operative relation to said reference member, means for mounting said moving element for movement relative to said reference member in said tracer assembly and restricting such movement to substantially linear motion, said linear motion being substantially parallel to the line of motion of said reference member, a tracer point mounted on said moving element and extending into contact with the profile of the surface of said specimen to be investigated, electric circuit means for producing voltages substantially proportional to the displacements of said moving element relative to said reference member, and means utilizing said voltage output to indicate the displacements of said tracer point produced by the irregularities of the profile of the surface of said specimen being investigated.

3. An apparatus for investigating the profile of the surface of a specimen, which comprises a base member with an upright portion, a carrier member, adjustable means for moving said carrier member to and from said base member on said upright portion, a support member, pivot means for mounting said support member on said carrier member, means for adjustably moving said support member on said carrier member, a slide member, means with ways for supporting said slide member on said support member, means for moving said slide member on said ways, a pilot surface adjacent to said slide member, said pilot surface being supported by said support member, a tracer assembly having a frame fixedly mounted on said slide member, said tracer assembly having a reference member therein mounted for movement relative to said frame member, said reference member being restricted to substantially linear motion, said linear motion being substantially perpendicular to the surface of said specimen, a skid member mounted on said reference member and extending into contact with said pilot surface for sliding thereon, said tracer assembly also having a moving element in operable relation to said reference member, means for mounting said moving element for movement relative to said reference member in said tracer assembly and restricting such movement to substantially linear motion, said linear motion being substantially parallel to the line of motion of said reference member, a tracer point mounted on said moving element and extending into contact with the profile of the surface of said specimen to be investigated, said specimen being mounted on said base member, electric circuit means for producing voltages substantially proportional to the displacements of said moving element relative to said reference member, and means utilizing said voltage output to indicate the displacements of said tracer point produced by the irregularities of the profile of the surface of said specimen being investigated.

4. An apparatus for investigating the profile of the surface of a specimen, which comprises a base member with an upright portion, a carrier member, adjustable means for moving said carrier member to and from said base member on said upright portion, a support member, pivot means for mounting said support member on said carrier member, means for adjustably moving said support member on said carrier member, a slide member, means with ways for supporting said slide member on said support member, means for moving said slide member on said ways, a pilot surface member mounted on said support member adjacent to said slide member, a tracer assembly mounted on said slide member, said tracer assembly having a reference member consisting of a magnet member with a pole gap, said reference member being movably mounted on said tracer assembly and restricted to substantially linear motion, said linear motion being substantially perpendicular to the surface of said specimen, a skid member mounted on said reference member and extending into contact with said pilot surface for sliding thereon, said tracer assembly also having a moving element comprising a coil of insulated wire adapted to move in the pole gap of said magnet member, said moving element being movably mounted on said tracer assembly and restricted to substantially linear motion, said linear motion being substantially parallel to the line of motion of said reference member, a tracer point mounted on said moving element and extending into contact with the profile of the surface of said specimen to be investigated, said specimen being mounted on said base member, and means for receiving the voltage output of said coil and using same to indicate the displacements of said moving element relative to said reference element as said tracer point is moved over the profile of said specimen.

5. In an apparatus for investigating the profile of the surface of a specimen, the combination which comprises a tracer assembly having a frame, a reference member movably mounted on said frame for substantially linear motion, a skid member connected with said reference member for direct movement therewith, said skid member being adapted to contact and be guided over a surface external to said tracer assembly, said tracer assembly also having a moving element, a support member rigidly fastened to said moving element, said support member being movably mounted on said tracer assembly frame so as to restrict said moving element to substantially linear motion, said reference element and said moving element having substantially parallel lines of motion and being in operative relation to each other, and a contact element directed oppositely to said skid member and mounted for motion with said moving member and adapted to be moved along and in contact with the surface of said specimen to be investigated.

6. In an aparatus for investigating the profile of the surface of a specimen, the combination which comprises a tracer assembly having a frame, a reference member movably mounted on said frame for substantially linear motion, a skid member connected with said reference member for direct movement therewith, said skid member being adapted to contact and be guided over a surface external to said tracer assembly, said tracer assembly also having a moving element, a support member rigidly fastened to said moving element, said support member being movably mounted on said assembly frame so as to restrict said moving element to substantially linear motion, said reference element and said moving element having substantially parallel lines of motion and being in operative relation to each other, a contact element resting on the profile of the surface of said specimen being investigated, said contact element being directed oppositely to said skid member and mounted for motion with said moving member, electric circuit means for producing voltages substantially proportional to said displacements of said moving element relative to said reference element, and means for utilizing said voltage output to indicate the displacements of said contact element produced by the irregularities of the profile of the surface of said specimen being investigated.

7. In an apparatus for measuring displacements, the combination which comprises a tracer assembly having a frame, a reference member, a support member for said reference member, means for movably mounting said support member on said frame and restricting said reference member to substantially linear motion, a skid member mounted for movement with said reference member and adapted for contact with a surface external to said tracer assembly, said tracer assembly also having a moving element, a second support member rigidly fastened to said moving element, means for movably mounting said second support member on said assembly frame so as to restrict said moving element to a substantially linear motion, said moving element being in operative relation to said reference member, a contact element mounted for motion with said moving element and adapted for contact with a surface external to said tracer assembly, electric circuit means for producing voltages substantially proportional to said displacements of said moving element relative to said reference element, and means for utilizing said voltage output to indicate the displacements of said contact element produced by the irregularities of said surface external to said tracer assembly.

8. In an apparatus for measuring displacements, the combination which comprises a tracer assembly having a frame, a reference member in the form of a magnet with a suitable pole gap, a first coil for use in electrically energizing said magnet member to form an alternating-current electro-magnet, means for connecting said first coil to a suitable source of electricity, a support member for said reference member, means for movably mounting said support member on said frame and restricting said reference member to substantially linear motion, a skid member mounted for movement with said reference member and adapted for contact with a surface external to said tracer assembly, said tracer assembly also having a moving element comprising an electrically insulated second coil of wire, a second support member rigidly fastened to said moving element, means for movably mounting said second support member on said assembly frame so as to restrict said moving element to substantially linear motion, said second coil and said electro-magnet being in operative relation and having substantially parallel lines of motion, a contact element mounted for motion with said moving member and adapted for contact with a second surface external to said tracer assembly, and electrical means for utilizing the voltage output of said second coil of wire for indicating the displacements of said moving element relative to said reference member.

9. In an apparatus for investigating the profile of the surface of a specimen, a support member, a slide member, means for movably supporting said slide member on said support member, a pilot surface means adjacent to said slide member said pilot surface means being supported by said support member, a tracer assembly mounted on said slide member, said tracer assembly having a frame, a reference member, a second support member for said reference member, said second support member being movably mounted on said assembly frame so as to restrict said reference member to substantially linear motion, said linear motion being substantially perpendicular to the surface of said specimen, a skid member mounted for movement with said reference member and extending into contact with said pilot surface means for sliding thereon, said tracer assembly also having a moving element, a third support member for said moving element, said third support member being movably mounted on said assembly frame so as to restrict said moving element to substantially linear motion, said moving element being in operative relation to said reference member, said moving element and said reference member having substantially parallel lines of motion, and a tracer point mounted on said moving element, said tracer point extending in a direction facilitating the contacting of the profile of the surface of said specimen, electric circuit means for producing voltages substantially proportional to the displacements of said moving element relative to said reference member, and means utilizing said voltage output to indicate the displacements of said tracer point produced by the irregularities of the profile of the surface of said specimen being investigated.

10. In an apparatus for investigating the profile of the surface of a specimen, a support member, a slide member, means for movably supporting said slide member on said support member, a pilot surface member adjacent to said slide member and carried by said support member, means for angularly adjusting said support member to bring the pilot surface member into substantial parallelism with the surface of said specimen to be investigated, a tracer assembly mounted on said slide member, said tracer assembly having a frame, a reference member, a second support member for said reference member, said second support member being mounted on said assembly frame in manner providing for movement of said reference member relative to said frame while restricting said reference member to substantially linear motion, said linear motion being substantially perpendicular to the surface of said specimen, a skid member mounted for movement with said reference member and extending into contact with said pilot surface member for sliding thereon, said tracer assembly also having a moving element, a third support member for said moving element, said third support member being movably mounted on said assembly frame so as to restrict said moving element to substantially linear motion, said moving element being in operative relation to said reference member with said moving element and said reference member having substantially parallel lines of motion, a tracer point mounted on said moving element, said tracer point extending to a position facilitating the contacting of the face of said specimen to be investigated, electric circuit means for producing voltages substantially proportional to the displacements of said moving element relative to said reference member, and means utilizing said voltage output to indicate the displacements of said tracer point produced by the irregularities of the profile of the surface of said specimen being investigated.

11. In an apparatus for investigating the profile of the surface of a specimen, a support member, a slide member, means for movably supporting said slide member on said support member, a pilot surface member adjacent to said slide member, means for adjusting said support member to bring the pilot surface member into substantial parallelism with the surface of said specimen to be investigated, a tracer assembly mounted on said slide member, said tracer assembly having a frame, a reference member, a second support member for said reference member, means for movably mounting said second support member on said frame, and restricting said reference member to substantially linear motion, said linear motion being substantially perpendicular to the surface of said specimen, a skid member mounted for movement with said reference member and extending into contact with said pilot surface member for sliding thereon, means for exerting a suitable mild force on said reference member to hold said skid member in contact with the pilot surface of said pilot surface member, said tracer assembly also having a moving element, a third support member for said moving element, means for movably mounting said third support member on said assembly frame so as to restrict said moving element to substantially linear motion, said moving element being in operative relation to said reference member with said moving element and said reference member having substantially parallel lines of motion, a tracer point mounted for movement with said moving element, said tracer point extending into position facilitating the contacting of the face of said specimen to be investigated, means for exerting a suitably mild force on said moving element to hold said tracer point in contact with the surface of the specimen being investigated, electric circuit means for producing voltages substantially proportional to the displacements of said moving element relative to said reference member, and means utilizing said voltage output to indicate the displacements of said tracer point produced by the irregularities of the profile of the surface of said specimen being investigated.

12. In an apparatus for investigating the profile of the surface of a specimen, a support member, a slide member, means with ways for supporting said slide member on said support member, a pilot surface member adjacent to said slide member and carried by said support member, a tracer assembly mounted on said slide member, said tracer assembly having a frame, a reference member, a second support member for said reference member, a pivot means, said second support member being mounted on said assembly frame by said pivot means in manner providing for movement of said reference member relative to said frame while restricting said reference member to substantially linear motion, said linear motion being substantially perpendicular to the surface of said specimen, a skid member mounted on said reference member and extending into contact with the pilot surface of said pilot surface member for sliding thereon, said tracer assembly also having a moving element, a third support member for said moving element, a pivot means on one end of said moving element support member, means for fastening said pivot means on said frame in manner restricting said moving element to substantially linear motion, said moving element being in operative relation to said reference member with said moving element and said reference member having substantially parallel lines of motion, and a tracer point mounted for movement with said moving element, said tracer point extending into position facilitating the contacting of the profile of the surface of said specimen, said skid member and said tracer point being mounted between said specimen and said pilot surface member, electric circuit means for producing voltages substantially proportional to the displacements of said moving element relative to said reference member, and means utilizing said voltage output to indicate the displacements of said tracer point produced by the irregularities of the profile of the surface of said specimen being investigated.

13. In an apparatus for investigating the profile of the surface of a specimen, a support member, a slide member, means with ways for supporting said slide member on said support member, a pilot surface member adjacent to said slide member, said pilot surface member being supported by said support member, a tracer assembly mounted on said slide member, said tracer assembly having a frame, a reference member, a second support member for said reference member, a pivot member on one end of said second support member, means for fastening said pivot member on said frame in manner restricting the movement of said reference member relative to said frame to substantially linear motion, said linear motion being substantially perpendicular to the surface of said specimen, a skid member mounted on said reference member and extending into contact with the pilot surface of said pilot surface member for sliding thereon, said tracer assembly also having a moving element, a third support member for said moving element, a pivot means on one end of said support member for said moving element, means for fastening said pivot member on said frame in manner restricting said moving element to substantially linear motion, said moving element being in operative relation to said reference member with said moving element and said reference member having substantially parallel lines of motion, the pivot members of said reference member and said moving element being on the same end of said second and third support members and adjacent each other, and a tracer point mounted for movement with said moving element, said tracer point extending into position facilitating the contacting of the profile of the surface of said specimen, said skid member and said tracer point being mounted between said specimen and said pilot surface member, said reference element and said moving element being adapted to produce voltages as they move relative to each other, and means utilizing said voltage output to indicate the displacements of said moving element relative to said reference member as said tracer point is moved over and in contact with the surface of said specimen being investigated.

14. In an apparatus for investigating the profile of the surface of a specimen, a support member, a slide member, means for movably supporting said slide member on said support member, a pilot surface member mounted on said support member adjacent to said slide member, a tracer assembly mounted on said slide member, said tracer assembly having a frame, a reference member in the form of a magnet with a suitable pole gap, a support member for said magnet, said support member being movably mounted on said tracer assembly frame so as to restrict said magnet to substantially linear motion, said linear motion being substantially perpendicular to the surface of said specimen, a skid member mounted for movement with said magnet and extending into contact with said pilot surface member for sliding thereon, said tracer assembly also having a second support member, said second support member being movably mounted on said tracer assembly frame so as to restrict its end adjacent to said magnet to substantially linear motion, an electrically insulated coil of wire mounted on said second support member in operative relation to the pole gap of said magnet, said coil and said magnet having substantially parallel lines of motion, and a tracer point mounted on said second support member, said tracer point extending in a direction facilitating the contacting of the profile of the surface of said specimen, and means for receiving the voltage output of said coil and indicating thereby the displacements of said tracer point relative to said magnet as said tracer point is moved along and in contact with the surface of said specimen being investigated.

15. In an apparatus for investigating the profile of the surface of a specimen, a support member, a slide member, means for movably supporting said slide member on said support member, a pilot surface member rigidly mounted on said support member adjacent to said slide member, a tracer assembly mounted on said slide member, said tracer assembly having a frame, a reference member in the form of a magnet with a suitable pole gap, a primary coil for use in electrically energizing said magnet member to form an alternating-current electro-magnet, means for connecting said primary coil to a suitable source of electricity, a support member for said electro-magnet, said support member being movably mounted on said tracer assembly frame so as to restrict said electro-magnet to substantially linear motion, said linear motion being substantially perpendicular to the surface of said specimen, a skid member mounted for movement with said electro-magnet and extending into contact with said pilot surface member for sliding thereon, said tracer assembly also having a second support member, said second support member being movably mounted on said tracer assembly frame so as to restrict its end adjacent to said electro-magnet to substantially linear motion, and an electrically insulated secondary coil of wire mounted on said second support member in operative relation to the pole gap of said electro-magnet, said secondary coil and electro-magnet having substantially parallel lines of motion, and a tracer point mounted on said second support member, said tracer point being adjacent said secondary coil and extending in a direction facilitating the contacting of the profile of the surface of said specimen, and means for receiving the voltage output of said secondary coil and indicating thereby the displacements of said tracer point relative to said electro-magnet as said tracer point is moved along and in contact with the surface of said specimen being investigated.

16. In an apparatus for investigating the profile of the surface of a specimen, a support member, a slide member, means for movably supporting said slide member on said support member, a pilot surface member adjacent to said slide member, said pilot surface being supported by said support member, a tracer assembly mounted on said slide member, said tracer assembly having a frame, a second support member, a skid member mounted on said second support member, means for movably mounting said support member on said tracer assembly frame so as to restrict said skid member to substantially linear motion, said linear motion being substantially perpendicular to the surface of said specimen with said skid member extending into contact with said pilot surface member for sliding thereon, said second support member in said tracer assembly also having a piezo crystal rigidly mounted thereon, a tracer point mounted on said piezo crystal substantially at the free end thereof and extending into position facilitating the contacting of said specimen, said tracer point and skid member having substantially parallel lines of motion, electric connections to said crystal for contacting the electricity produced therein due to the mechanical stressing of said crystal as said tracer point is moved over and in contact with the surface of said specimen being investigated, and means for receiving the electric output of said piezo crystal and determining thereby the displacements of said tracer point relative to said skid.

ERNEST J. ABBOTT.

REFERENCES CITED

The following references are of record in the file of this patent:

UNITED STATES PATENTS

| Number | Name | Date |
|---|---|---|
| 1,708,333 | Smith | Apr. 9, 1929 |
| 2,048,154 | Abbott et al. | July 21, 1936 |
| 2,171,433 | Powers | Aug. 29, 1939 |
| 2,344,217 | Reason et al. | Mar. 14, 1944 |
| 2,363,691 | Reason | Nov. 28, 1944 |
| 2,396,394 | Shaw | Mar. 12, 1946 |